United States Patent [19]

O'Farrill et al.

[11] Patent Number: 5,458,306
[45] Date of Patent: Oct. 17, 1995

[54] SUPPORT FOOT FOR A MONO POD FOR STILL AND VIDEO CAMERA USE

[76] Inventors: Dave O'Farrill, 530 Pine St., Chico, Calif. 95928; Ralph S. Colombo, P.O. Box 1158, Magalia, Calif. 95954

[21] Appl. No.: 239,616

[22] Filed: May 9, 1994

[51] Int. Cl.$^6$ .................................................. F16M 11/20
[52] U.S. Cl. ............................ 248/188.8; 248/346.03; 248/514; 248/519; 354/81
[58] Field of Search ........................... 248/188.8, 188.9, 248/176, 514, 519, 534, 346; 354/81, 82, 293; D16/342

[56] References Cited

U.S. PATENT DOCUMENTS

| D. 349,716 | 8/1994 | O'Farrill et al. | D16/242 |
|---|---|---|---|
| 4,671,476 | 6/1987 | Yim | 248/514 X |
| 5,332,136 | 7/1994 | Rudolph | 354/293 X |

*Primary Examiner*—Ramon O. Ramirez

[57] ABSTRACT

A flat base pivotally attaches to the lower end of a mono or uni pod forming a foot to provide stabilization for a still or a video camera mounted on the upper end of the pod. One end of the foot is a flat platform on which a photographer can place the toe end of his/her own foot to further stabilize a camera during picture taking.

3 Claims, 2 Drawing Sheets

SUPPORT FOOT FOR A MONO POD FOR STILL AND VIDEO CAMERA USE

BACKGROUND OF THE INVENTION

1. Field of the Invention

This invention relates to foot-like supports for single pole camera legs. Single pole camera legs are generally referred to as uni-pods or as mono pods and are usually only tip padded at the ground-rest end. To provide better support, the present invention is particularly directed towards a ground-resting auxiliary foot which can be attached to the lower terminal end of a mono pod.

2. Description of the Prior Art

Although some types of mono pod camera supports are seen in past art patents, the early disclosures were mostly directed at resting the lower end of the pod on a belt or breast plate. Later disclosures are principally directed towards tripod type supports. A principal fault with devices which rest anywhere on the photographer's body is distortion in the picture because of body movement which is almost impossible to prevent.

Typical of the older patents is U.S. Pat. No. 817,207 issued to H. L. Wheeler on Apr. 10, 1906 entitled "Camera Support." Wheeler uses a single pole resting on a plate attached to his belt. A sling around his neck is supposed to provide additional stability. It appears, however, that his devices would only add to the instability of resting a camera in a manner dependent entirely on the human body for support.

The "Portable Camera Support" patented by C. B. Paul on Mar. 5, 1935, U.S. Pat. No. 1,993,485, also uses a neck strap. His neck strap has a shield-like plate which supports a camera on a single pole with the pole fitting a receptacle on the plate. In use, the plate rests against the photographer's waist about at the belt line. Here again we see the human body being the only base support for the camera.

An example of using fold-up feet on the ends of a tripod are seen in U.S. Pat. No. 5,003,328, issued to T. L. Gaynor on Mar. 26, 1991. The feet, as Gaynor calls them, have three opposing sections which appear somewhat cumbersome relative to the tripod leg structure. Gaynor uses a split end tube which is pulled together by an automotive type collar to retain his tripod legs in his foot attachment in one type of structure and a threaded leg fitting in another.

The foregoing are examples of past art devices for supporting cameras. The principal fault seen in past art sampling is resting the camera support on the human body as seen in the first two examples. In the second example, using a three sectioned foot having each section attached by a snap hinge and having to retain the folded up feet with a second strap seems a little much to add to an already burdened tripod.

SUMMARY OF THE INVENTION

Therefore, in practicing our invention, we provide a flat base which attaches to the lower end of a mono or uni pod forming a foot therefor to provide stabilization for a still or a video camera mounted on the upper end of the pod. The foot is pivotally attached and offers a flat platform extending towards the photographer. Although our support foot alone will provide considerable stabilization for the pod, when the photographer places his or her foot on the surface of our foot, the stabilization becomes substantial. With this invention, persons taking still or video pictures can operate the camera hands free without their breathing or touching the pod causing any distortion in the picture taking. We also provide a simple but stable method of attaching the mono pod end to our foot either by a single bolt fitting an aperture already in the base of the pod.

Therefore, a principal object of the present invention is to provide a foot attachable to a mono pod as a ground supporting stabilization base when using the mono pod with a still or video camera.

Another object of the invention is to provide a support foot for a mono pod which is pivotally attached and can be folded up along the side of the pod shaft for transporting or storage purposes without removing the foot from the end of the mono pod and the folded foot requiring no strapping to remain in place.

A further object of this invention is to provide a foot for a mono pod which can be attached by a single pivotal bolt through an aperture already in the pod pole.

Other objects and the many advantages of the present invention will become clear from reading the specification and comparing numerically designated parts described relative to the same numbered parts illustrated in the drawings.

DESCRIPTION OF THE PREFERRED EMBODIMENTS

Figure 1:
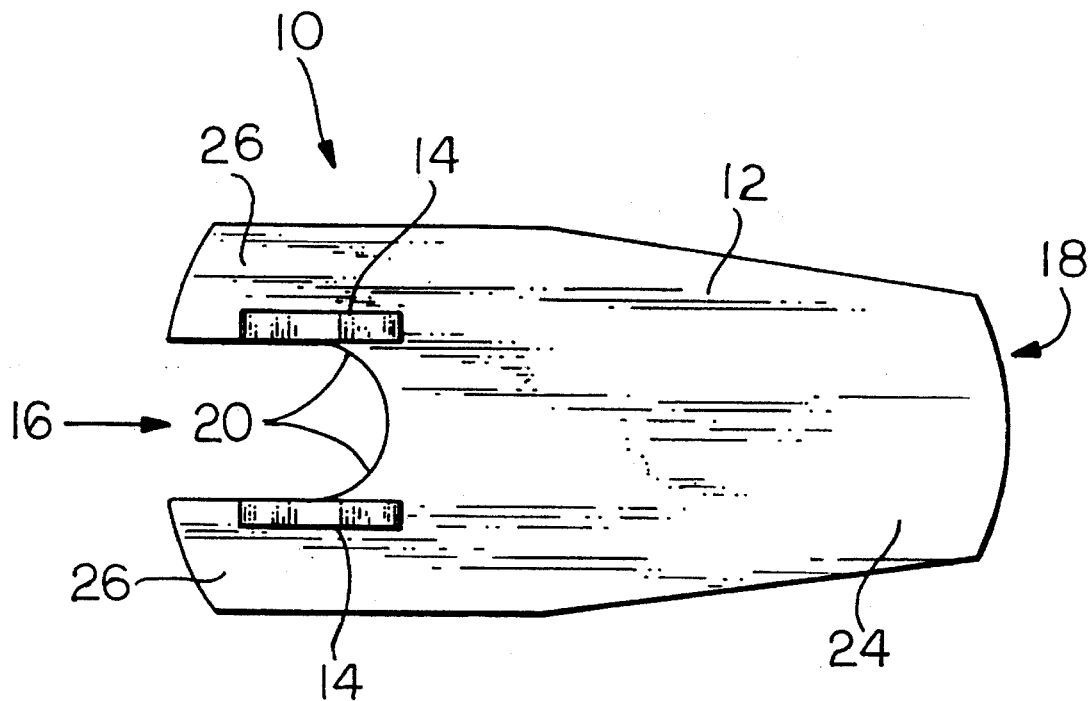
FIG. 1 shows the basic foot according to the invention in a top plan view.
Figure 2:
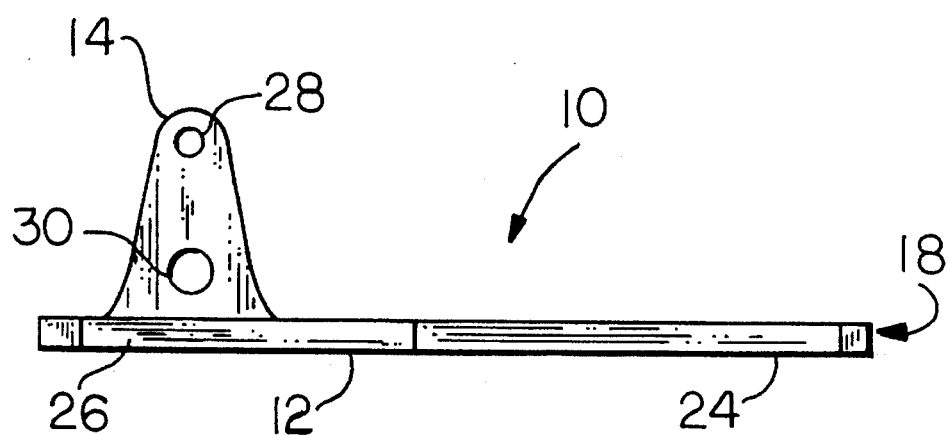
FIG. 2 shows the FIG. 1 embodiment of the invention in a side elevation view.

Referring now to the drawing Figures where the number 10 generally references the invention as foot structure 10. In FIG. 1, foot structure 10 includes elongated flat base 12 having a designated front end 16 and a designated rear end 18. A U-shaped opening 20 in front end 16 of base 12 is aligned along two straight sides by two mono pod support bridges 14, one on each side of U-shaped opening 20. Bridges 14 are in parallel alignment affixed on the top surface of base 12 on a widened front section 26 which forms toes on either side of U-shaped opening 20. Bridges 14 are designed to support the single leg on a mono or uni pod which are often used in place of tripods as camera stabilizers during picture taking. Towards rear 18, the edges of base 12 angle in to form narrow section 24 and base 12 terminates in a round tab-like pad at rear 18. The thickness of base 12 can be seen in FIG. 2 as can the rounded upright shape of pod support bridges 14. Pivotal attachment aperture 28 is in the upper section of bridge 14 and a design aperture 30 is in the lower section of bridge 14. Widened front section 26 can be seen below bridge 14 in the FIG. 2 illustration and narrow section 24 is towards rear 18.

Figure 3:
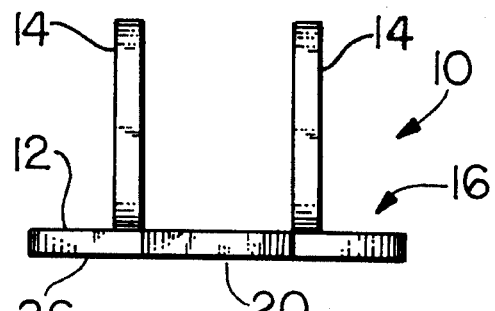
FIG. 3 is a front elevation view of the invention.
Figure 4:
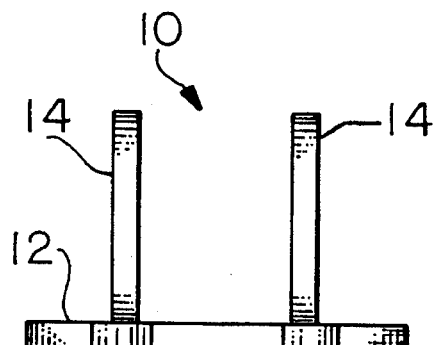
FIG. 4 shows the invention from the rear in an elevation view.

In the frontal view at FIG. 3 of foot structure 10, U-shaped opening 20 is in the center of base 12 at the front 16. The front edges of the two bridges 14 can be seen atop widened section 26 of base 12. A rear 18 view of base 12 is shown in FIG. 4 looking forward along narrowed section 24 from rear 18. Upright bridges 14 can be seen in a reversed position from the FIG. 3 placement.

Figure 5:
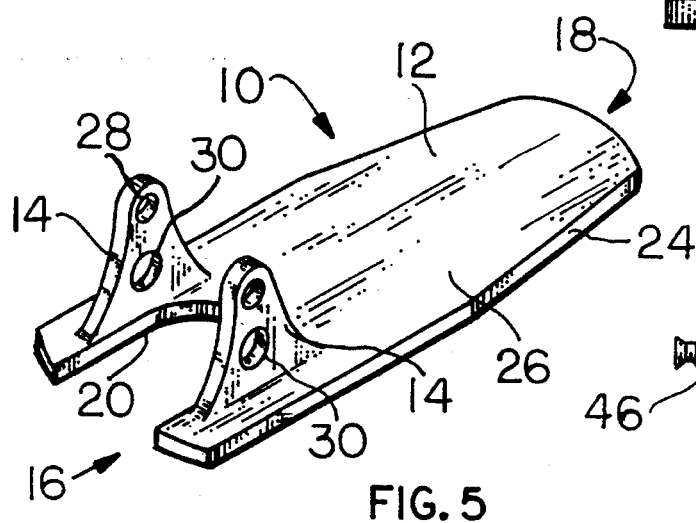
FIG. 5 is a perspective view of the foot structure.
Figure 7:
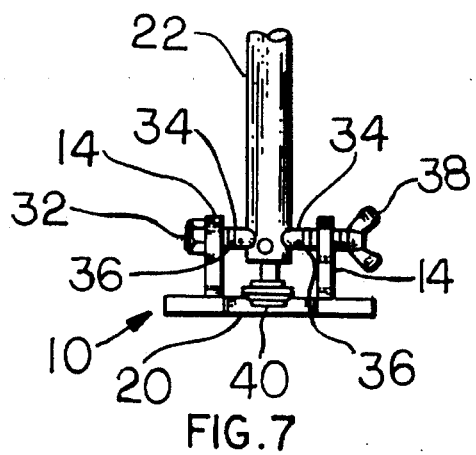
FIG. 7 is a reduced front sectional view of the lower end of a mono pod attached pivotally to the bridge structure of the foot of this invention by a single bolt retained adjustably by a wing nut.

The perspective illustration at FIG. 5 of foot structure 10 shows the positioning of bridges 14 along the sides of U-shaped opening 20 in a manner to align apertures 28. Pivotal rod support apertures 28 can be seen in FIG. 7 supporting pod leg 22 attached by bolt 32 and retained by wing nut 38. Specially structured spacers 34 maintain pod leg 22 in the proper position held by washers 36. Bolt 32 passes through an existing aperture in the lower section of mono pod leg 22. The purpose of U-shaped opening 20 can be seen in FIG. 7. This opening allows foot pad end 40 of pod leg 22 to rest in its usual ground position.

Figure 6:
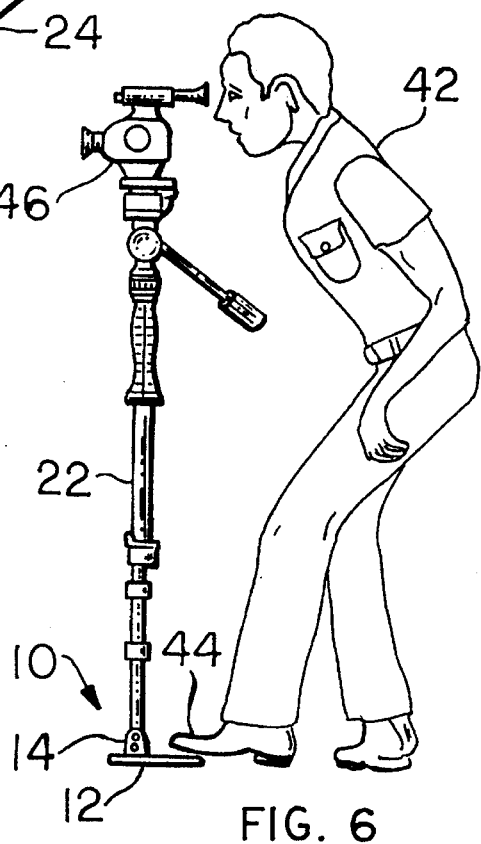
FIG. 6 shows the foot according to the invention attached to the ground end of a mono pod and a photographer stabilizing the pod by placing his own foot on the pod-supporting foot to hold the camera steady without using his hands.

FIG. 6 shows foot structure 10 assembled, attached to, and in use supporting mono pod 22 with camera 46 mounted on the upper end of mono pod 22. Photographer 42 is operating camera 46 hands off by placing the toe of his shoe 44 on the exposed back section of base 12. Although base 12 will maintain camera 46 in position on mono pod 22 without being held, when photographer 42 places the toe of his shoe 44 on base 12 this further stabilizes camera 46 and is a prime purpose for having base 12 extend somewhat back from the attachment to mono pod leg 22.

Foot structure 10 manufactured from a variety of materials including metals and plastics with the use of perforated stock for weight reduction used in some or all structural parts.

Although we have described embodiments of our invention with considerable detail in the foregoing specification and have illustrated them extensively in the drawings, it is to be understood that we may practice variations in the invention which do not exceed the scope of the appended claims, but any variations to our invention practiced by others which fall within the scope of our claims, we will consider to be our invention.

What is claimed is:

1. A support foot for pivotally supporting a mono pod having a foot pad for still and video camera use, comprising in combination:

(a) a one-piece flat base having an upper and a lower surface and a designated front end and a designated rear end;

(b) a U-shaped opening in said flat base at said designated front end for receiving the mono pad foot pad and allowing the foot pad to rest on the ground;

(c) two vertical bridges attached to said upper surface of said base adjacent said designated front end, one on each straight side of said U-shaped opening in opposing parallel alignment;

(d) aligned apertures through upper portions of said vertical bridges;

(e) means for pivotal attachment of said bridges to the mono pod camera support adjacent a lower terminal end utilizing said aligned apertures in said bridges;

(f) said one-piece flat base being extended and narrowed towards said designated rear end into a flat pad sized for at least a toe end of a camera operator's foot to be rested upon;

2. The device of claim 1 wherein said means for pivotal attachment of said bridges to the lower terminal end of a mono pod camera support utilizing said aligned apertures in said bridges, includes a bolt passed through said aligned apertures in said bridges and through a normally existing aperture in said mono pod adjacent the ground rest end; said mono pad centrally positioned on said bolts by shaped tubular spacers and washers, said bolt being removable affixed at a thread end by a retainer nut.

3. The retainer nut of claim 2 wherein said retainer nut is a wing nut.

\* \* \* \* \*